AMPLIFICATION CONTROL OF A TRANSISTOR

Filed Jan. 3, 1955

INVENTOR
ADRIANUS JOHANNES WILHELMUS
MARIE VAN OVERBEEK
BY Fred M. Vogel
AGENT 2,870,345
Patented Jan. 20, 1959

2,870,345

AMPLIFICATION CONTROL OF A TRANSISTOR

Adrianus Johannes Wilhelmus Marie van Overbeek, Eindhoven, Netherlands, assignor, by mesne assignments, to North American Philips Company, Inc., New York, N. Y., a corporation of Delaware Application January 3, 1955, Serial No. 479,586

Claims priority, application Netherlands February 2, 1954

8 Claims. (Cl. 307—88.5)

The present invention relates to a circuit arrangement for the amplification control of a transistor. More particularly, the invention relates to an arrangement for controlling the amplification factor of a transistor by means of a control-voltage, the signal to be amplified being applied between an emitter electrode and a base electrode. With such an arrangement there often occurs the difficulty that the amplification cannot be varied sufficiently intensively and within a sufficiently wide operational range, as a function of the control-voltage. The invention has for its object to provide a solution of this problem. In accordance with the invention, the terminal of the signal source remote from the said base electrode is connected through a low impedance for the signal frequencies to a second base electrode associated with the same type conductivity zone as the first base electrode and the control-voltage is applied to the said electrodes to provide that the part of the said zone operative for the amplification is displaced to the second base electrode under the action of the control-voltage.

In order that the invention may be readily carried into effect, it will now be described with reference to the accompanying drawing, wherein.

Figure 1:
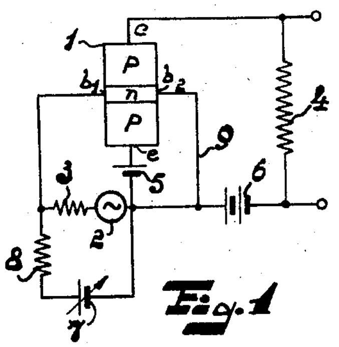
Fig. 1 is a schematic diagram of an embodiment of the circuit arrangement of the present invention.

In Fig. 1 a transistor 1 comprises an emitter electrode *e*, two base electrodes $b_1$ and $b_2$, associated with the same type -conductivity zone *n*, and a collector electrode *c*. A signal source 2 comprising an internal resistor 3, is connected between the electrodes *e* and $b_1$, and the amplified signal is obtained through a collector impedance 4. The bias voltage sources 5 and 6 serve to adjust the transistor 1 to the correct working point.

For the control of the amplification a variable control voltage source 7 is connected in series with a resistor 8 in parallel with the signal source 2 comprising the internal resistor 3. The second base electrode $b_2$ is connected through a negligible impedance 9 to the end of the signal source 2 remote from the electrode $b_1$.

The source 7 determines the bias voltage of the electrode $b_1$; if it is zero, the emitter-base junction will be driven in the forward direction in the proximity of the electrode $b_1$, so that the zone *n* becomes operative at this area for the signal amplification. However, if the source 7 is adequate, the emitter-base junction in the proximity of $b_1$ will be driven in the blocking direction, so that the operative part of the zone *n* is displaced to the electrode $b_2$, which is always adjusted in the forward direction. The signal voltage between the emitter electrode *e* and the zone *n* at the area of this operative part is, however, in this case decreased in the ratio of the resistance of the zone *n* between the electrode $b_1$ and this operative part and of the total resistance between the electrodes $b_1$ and $b_2$, so that the amplification of the transistor 1 is reduced accordingly.

Figure 2:
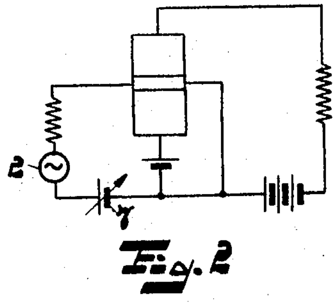
Fig. 2 is a modification of the embodiment of Fig. 1.

Fig. 2 is a modification of the embodiment of Fig. 1, in which the sources 2 and 7 are connected in series. The operation is otherwise completely analogous to that of Fig. 1.

Figure 3:
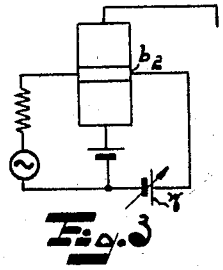
Fig. 3 is another modification of the embodiment of Fig. 1.

The arrangements of Figs. 1 and 2 have a limitation in that the second base electrode $b_2$ is always driven in the forward direction. Consequently, the zone *n* always constitutes a small impedance relative to the emitter electrode in the proximity of the electrode $b_2$. Thus the impedance constituted by the transistor 1 for the signal source 2 remains small and even decreases as the electrode $b_1$ is adjusted further in the forward direction. In order to reduce this disadvantage, the control-voltage source 7 may, as is shown in Fig. 3, be displaced to the circuit of the electrode $b_2$.

The most effective control is obtained, if the electrode $b_1$ is driven in the forward direction and the electrode $b_2$ in the blocking direction, while the control-voltage has the effect that simultaneously the bias voltage of the electrode $b_1$ is shifted further to the blocking direction and the bias voltage of the electrode $b_2$ is shifted further to the forward direction. This is realized in the embodiment of Fig. 4, in which the electrodes *e* and $b_2$ are interconnected for signal oscillations by way of a capactior 11, while resistors 12 and 13 are included in the circuits of the electrodes *e* and $b_2$, respectively. Bias voltage sources 14 and 15 are adjusted in a manner such that if the control-voltage of the source 7 is zero, the electrode $b_1$ is adjusted in the forward direction so that the emitter current across the resistor 12 produces such a voltage drop that the electrode $b_2$ is adjusted in the blocking direction. If then the control-voltage of the source 7 is increased, the electrode $b_1$ will be driven in the blocking direction, so that the voltage-drop across the resistor 12 becomes so great that the electrode $b_2$ is adjusted in the forward direction. The operative part of the base zone *n* then shifts from the electrode $b_1$ to the electrode $b_2$, said zone operating again as a potentiometer and reducing the amplification more and more.

Figure 4:
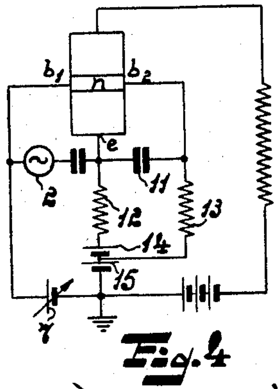
Fig. 4 is a schematic diagram of another embodiment of the circuit arrangement of the present invention.
Figure 5:
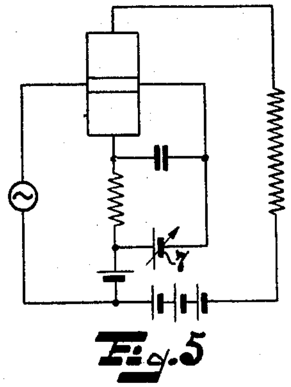
Fig. 5 is a modification of the embodiment of Fig. 4.

Fig. 5 is a modification of the embodiment of Fig. 4. The operation of Fig. 5 is the same as that of Fig. 4. Similarly to Fig. 3, in Fig. 5 the control-voltage source 7 is connected in the circuit of the electrode $b_2$.

Figure 6:
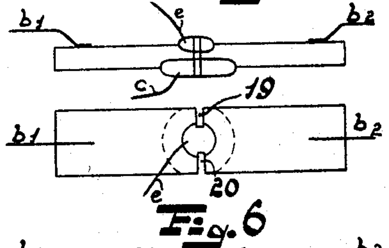
Fig. 6 is a schematic diagram of an embodiment of the transistor of the circuit arrangement of the present invention.

The transistor of the arrangements of Figs. 1 to 5 may for example be of the type in which zones of alternating conductivity types are drawn up from the melt. Fig. 6 shows the lateral view and the plan view of a transistor of the "alloy" type, in which in a crystal body of one conductivity type (for example n-type germanium) zones of opposite conductivity types are formed one on each side by the alloy with sealed-in masses, for example indium, provided at that area. These zones are connected to the emitter electrode *e* and the collector electrode *c*, respectively, and the crystal body itself is provided with the base electrodes $b_1$ and $b_2$. In order to insure an adequate voltage drop in the operative part of the base zone, where the emitter zone and the collector zone approach one another, saw-cuts 19 and 20 are provided one on each side. The saw-cuts extend into the emitter zone.

Figure 7:
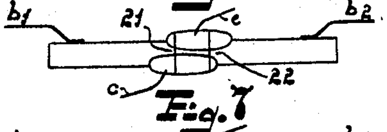
Fig. 7 is a modification of the embodiment of Fig. 6.

Fig. 7 is a modification of the transistor of Fig. 6, in which the emitter zone, and the collector zone associated with the electrodes $e$ and $c$, respectively, are displaced relatively to one another. This transistor offers the possibility of obtaining an amplified control-effect, for example if used in the arrangement of Fig. 4, since, if the electrode $b_1$ of Fig. 7 is adjusted in the forward direction and the electrode $b_2$ in the blocking direction, the operative part of the base zone will be located in the proximity of the point 21, where the charge carriers starting from the emitter zone are opposite a large collector surface, so that the recombination is small and hence the collector-base current amplification factor $\alpha'$ is high. However, if on the contrary the electrode $b_1$ is adjusted in the blocking direction and the electrode $b_2$ in the forward direction, the operative part of the base zone is displaced to point 22, where the effective collector surface is small, so that the recombination is high and hence the current amplification factor $\alpha'$ is low.

Figure 8:
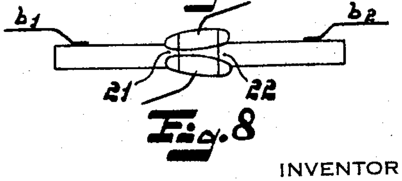
Fig. 8 is another modification of the embodiment of Fig. 6.

A similar effect may be obtained, as is shown in Fig. 8, as desired in conjunction with the embodiment shown in Fig. 7, since the emitter zone and the collector zone remain spaced apart by a gradually increasing space. If, with a variation in the bias voltages of the electrodes $b_1$ and $b_2$, the operative part of the base zone shifts from point 21 to point 22, the current amplification factor $\alpha'$ will drop again. This is due in this case, to the larger thickness of the base zone at the area of this operative part.

As a matter of course, the conductivity types of the various zones may be reversed in each of the arrangements shown, provided that the polarities of the supply sources are also reversed. The voltage of the source 7 may be produced by means of an amplitude detector in the case of automatic gain control and with contrast control.

While the invention has been described by means of specific examples and in specific embodiments, I do not wish to be limited thereto, for obvious modifications will occur to those skilled in the art without departing from the spirit and scope of the invention.

What is claimed is:

1. A circuit arrangement comprising a transistor having a conductivity zone, an emitter electrode, a collector electrode and a plurality of base electrodes in contact with said zone, means for applying an input signal voltage between said emitter electrode and one of said base electrodes, means for connecting another of said base electrodes to said emitter electrode, said connecting means having a low impedance at signal frequencies, a source of control voltage, means for connecting said source of control voltage to said base electrodes whereby a part of said zone is biased in the forward direction with respect to said emitter electrode and the amplification factor of said transistor is controlled by shifting said part of said zone from one base electrode to another base electrode thereby varying the signal amplitude operative in said part, and means for deriving an output voltage from said collector electrode.

2. A circuit arrangement as claimed in claim 1, wherein the amplification factor of said transistor varies with the position of the portions of said zone in proximity with the base electrode in control thereof.

3. A circuit arrangement comprising a transistor having a conductivity zone, an emitter electrode, a collector electrode and a pair of base electrodes in contact with said zone, a source of input signal voltage having two terminals, one of said terminals being connected to said emitter electrode and the other of said terminals being connected to one of said base electrodes, means for connecting the other of said base electrodes to said emitter electrode, said connecting means having a substantially low electrical impedance at signal frequencies, a source of control voltage, means for connecting said source of control voltage across said source of input voltage whereby said source of control voltage is connected to said base electrodes whereby a part of said zone is biased in the forward direction with respect to said emitter electrode and the amplification factor of said transistor is controlled by shifting said part of said zone from one base electrode to the other base electrode thereby varying the signal amplitude operative in said part, and means for deriving an output voltage from said collector electrode.

4. A circuit arrangement comprising a transistor having a conductivity zone, an emitter electrode, a collector electrode and a pair of base electrodes in contact with said zone, a source of input signal voltage, a source of control voltage connected in series circuit arrangement with said source of input voltage, means for connecting one of said base electrodes to said emitter electrode, said connecting means having a substantially low electrical impedance at signal frequencies, means for connecting said series circuit arrangement between said emitter electrode and the other of said base electrodes whereby a part of said zone is biased in the forward direction with respect to said emitter electrode and the amplification factor of said transistor is controlled by shifting said part of said zone from one base electrode to the other base electrode thereby varying the signal amplitude operative in said part, and means for deriving an output voltage from said collector electrode.

5. A circuit arrangement comprising a transistor having a conductivity zone, an emitter electrode, a collector electrode and a pair of base electrodes in contact with said zone, a source of input voltage having two terminals, one of said terminals being connected to said emitter electrode and the other of said terminals being connected to one of said base electrodes, a source of control voltage, means for connecting said source of control voltage between the other of said base electrodes and said emitter electrode whereby said source of control voltage is connected to said base electrodes whereby a part of said zone is biased in the forward direction with respect to said emitter electrode and the amplification factor of said transistor is controlled by shifting said part of said zone from one base electrode to the other base electrode thereby varying the signal amplitude operative in said part, and means for deriving an output voltage from said collector electrode.

6. A circuit arrangement comprising a transistor having a conductivity zone, an emitter electrode, a collector electrode and a plurality of base electrodes in contact with said zone, means for applying an input voltage between said emitter electrode and one of said base electrodes, means for coupling another of said base electrodes to said emitter electrode, a source of control voltage, means for coupling said source of control voltage to said base electrodes comprising a resistor of relatively high resistance value whereby a base electrode driven in the forward direction is shifted to the blocking direction and another base electrode driven in the blocking direction is simultaneously shifted to the driving direction, and means for deriving an output voltage from said collector electrode.

7. A circuit arrangement comprising a transistor having a conductivity zone, an emitter electrode, a collector electrode and a pair of base electrodes in contact with said zone, a source of input voltage having two terminals, one of said terminals being coupled to said emitter electrode and the other of said terminals being connected to one of said base electrodes, means for coupling the other of said base electrodes to said emitter electrode, a source of control voltage, means for connecting said source of control voltage across said source of input voltage comprising a resistor of relatively high resistance value connected between said emitter electrode and said source of control voltage whereby said source of control voltage is connected to said base electrodes whereby a base electrode driven in the forward direction is shifted to the blocking direction and another base electrode driven in the blocking direction is simultaneously shifted to the driving direction, and means for deriving an output voltage from said collector electrode.

8. A circuit arrangement comprising a transistor having a conductivity zone, an emitter electrode, a collector electrode and a pair of base electrodes in contact with said zone, a resistor of relatively high resistance value, a source of input voltage having two terminals, one of said terminals being connected to said emitter electrode through said resistor and the other of said terminals being connected to one of said base electrodes, a source of control voltage, means for connecting said source of control voltage between the other of said base electrodes and a point on the connection between said one terminal and said resistor whereby said source of control voltage is connected to said base electrodes whereby a base electrode driven in the forward direction is shifted to the blocking direction and another base electrode driven in the blocking direction is simultaneously shifted to the driving direction, means for coupling said other base electrode to said emitter electrode, and means for deriving an output voltage from said collector electrode.

References Cited in the file of this patent

UNITED STATES PATENTS

| | | |
|---|---|---|
| 2,657,360 | Wallace | Oct. 27, 1953 |
| 2,673,948 | Matare et al. | Mar. 30, 1954 |
| 2,709,787 | Kircher | May 31, 1955 |
| 2,717,343 | Hall | Sept. 6, 1955 |